United States Patent

Nakai et al.

[11] Patent Number: 5,206,480
[45] Date of Patent: Apr. 27, 1993

[54] WIRE ELECTRODE FOR ELECTRO-DISCHARGE MACHINING

[75] Inventors: Yoshihiro Nakai; Kazuo Sawada; Kouichi Yamada; Shigeo Ezaki, all of Osaka, Japan

[73] Assignee: Sumitomo Electric Industries, Ltd., Osaka, Japan

[21] Appl. No.: 859,258

[22] Filed: Mar. 26, 1992

Related U.S. Application Data

[63] Continuation of Ser. No. 530,519, May 3, 1990, abandoned.

[30] Foreign Application Priority Data

May 31, 1989 [JP] Japan ................... 1-139845

[51] Int. Cl.$^5$ ................................ B23H 7/08
[52] U.S. Cl. ..................... 219/69.12; 420/478
[58] Field of Search ............... 219/69.12, 69.15; 148/11.5 C; 420/477, 478; 72/237, 286, 289

[56] References Cited

U.S. PATENT DOCUMENTS

| | | | |
|---|---|---|---|
| 3,882,712 | 5/1975 | Shapiro et al. | 148/11.5 C |
| 4,287,404 | 9/1981 | Convers et al. | 219/69.12 |
| 4,424,432 | 1/1984 | Kaneko et al. | 219/69.12 |
| 4,673,790 | 6/1987 | Sawada et al. | 219/69.12 |
| 4,982,590 | 1/1991 | Yoshida | 72/237 |

FOREIGN PATENT DOCUMENTS

| | | | |
|---|---|---|---|
| 56-90943 | 7/1981 | Japan | 219/69.12 |
| 59-50141 | 3/1984 | Japan | 219/69.12 |
| 129744 | 7/1984 | Japan | 219/69.12 |
| 59-179769 | 10/1984 | Japan | 148/11.5 C |
| 60-129744 | 7/1985 | Japan | 219/69.12 |
| 249528 | 12/1985 | Japan | 219/69.12 |
| 60-263625 | 12/1985 | Japan | 219/69.12 |
| 293725 | 12/1986 | Japan | 219/69.12 |

*Primary Examiner*—Geoffrey S. Evans
*Attorney, Agent, or Firm*—Lowe, Price, LeBlanc & Becker

[57] ABSTRACT

A wire electrode for electro-discharge machining made of a Cu alloy containing 38 to 50 percent by weight of Zn. The Cu alloy may also contain 0.01 to 1.0 percent by weight of Zr, 0.001 to 0.05 percent by weight in total of at least one element selected from a group of Ce, Ti, Mg, Bi and Mn, and/or 0.01 to 2.0 percent by weight of at least one element selected from a group of Al, Si, Fe, Ca and La. A method of manufacturing a wire electrode for electro-discharge machining, comprising the steps of preparing a Cu alloy material containing 38 to 50 percent by weight of Zn and thinning the Cu alloy material employing roll working and/or warm working at least in a part of working process.

8 Claims, No Drawings

WIRE ELECTRODE FOR ELECTRO-DISCHARGE MACHINING

This application is a Continuation application of application Ser. No. 07/530,519, filed May 30, 1990, now abandoned.

BACKGROUND OF THE INVENTION

1. Field of the Invention

The present invention relates to a wire electrode, which is employed for wire electro-discharge machining.

2. Description of the Background Art

Wire electro-discharge machining is a method of causing intermittent discharge between a linear working electrode called a wire electrode for electro-discharge machining and a workpiece through a working fluid such as water or oil for relatively moving the workpiece with respect to the wire electrode for electro-discharge machining, thereby to melt and cut the workpiece into a desired configuration. This method is utilized for manufacturing various types of molds and the like. In such wire electro-discharge machining, required are processing characteristics such as excellent finishing, high working accuracy and a good finished surface state of the workpiece, no adhesion of the wire electrode to the workpiece and a short electro-discharge machining time. A wire electrode employed for such wire electro-discharge machining is generally prepared by a brass wire, which has good drawability and high strength required for a wire electrode.

With respect to improvement/advancement of a working power source, awaited is a wire electrode which can improve the processing speed. The wire electrode which can improve the processing speed is particularly desired for the case of employing a power source of a wire electro-discharge machine which provides high and short-time pulse voltage.

In the general wire electrode for electro-discharge machining which is prepared by a brass wire, however, it has been impossible to attain a sufficiently high processing speed. Further, the wire electrode is adhered to the workpiece in a large amount, while the wire electrode is easily broken when electro-discharge machining is performed at a high processing speed.

SUMMARY OF THE INVENTION

An object of the present invention is to provide a wire electrode for electro-discharge machining, which can reduce the processing time and is hardly adhered to the workpiece, and a method of manufacturing the same.

The inventive wire electrode for electro-discharge machining is made of a Cu alloy which contains 38 to 50 percent by weight of Zn. If the content of Zn is less than 38 percent by weight, no effect of improving the processing speed is attained. If the Zn content exceeds 50 percent by weight, on the other hand, it is difficult to thin the wire electrode.

According to the present invention, the Zn content is preferably 40 to 50 percent by weight, and more preferably 40 to 46 percent by weight.

The inventive wire electrode contains a larger amount of Zn as compared with brass, which has been employed for preparing a general wire electrode, so as to improve the processing speed and reduce the amount of adhesion to the workpiece. Further, it is possible to reduce breaking caused during electro-discharge machining.

A wire electrode for electro-discharge machining according to a preferred embodiment of the present invention is made of a Cu alloy which contains 40 to 50 percent by weight of Zn and 0.01 to 1.0 percent by weight of Zr.

When the Zn content is increased, the processing characteristics are improved but $\beta$ phase is generated to cause difficulty in drawing into a fine wire by a method similar to a general one. According to this embodiment, therefore, the Cu alloy contains 0.01 to 1.0 percent by weight of Zr, in order to improve workability.

The inventors have made deep study as to relations between additional elements for Zn in contents exceeding 40 percent by weight, drawability in cold working and processing characteristics, to find that the $\beta$ phase is dispersed to improve drawability in cold working when 0.01 to 1.0 percent by weight of Zr is added to Zn which is in a content of 40 to 50 percent by weight. The embodiment is based on such recognition. If the content of Zr is less than 0.01 percent by weight, an effect of improving workability is reduced, while such an effect of improving workability is saturated and the processing speed is reduced if the Zr content exceeds 1.0 percent by weight. Further, if the Zn content exceeds 50 percent by weight, addition of Zr shows only a little effect.

Such addition of Zr improves not only workability but also electro-discharge machining characteristics such as the processing speed.

A wire electrode for electro-discharge machining according to another preferred embodiment of the present invention is made of a Cu alloy which contains 40 to 50 percent by weight of Zn and 0.001 to 0.05 percent by weight in total of at least one element selected from a group of Ce, Ti, Mg, Bi and Mn.

Also in this embodiment, at least one element selected from the group of Ce, Ti, Mg, Bi and Mn is added in order to improve workability, which is deteriorated by generation of $\beta$ phase, similarly to the above embodiment. The inventors have found that the $\beta$ phase is refined by such addition of the element(s) to enable cold drawing, increase the processing speed and improve surface smoothness.

If the content of the additional element(s) is less than 0.001 percent by weight, effects of improving electro-discharge machining characteristics such as the processing speed and surface smoothness and cold drawability are reduced, while such effects are saturated if the content exceeds 0.05 percent by weight.

A wire electrode for electro-discharge machining according to still another preferred embodiment of the present invention is made of a Cu alloy which contains 40 to 50 percent by weight of Zn and 0.01 to 2.0 percent by weight in total of at least one element selected from a group of Al, Si, Fe, Ca and La.

Also in this embodiment, at least one element selected from the group of Al, Si, Fe, Ca and La is added in order to improve workabiltiy, which is deteriorated by generation of $\beta$ phase.

If the content of the additional element(s) is less than 0.01 percent by weight in total, an effect of improving workability is reduced while such an effect of improving workability is saturated if the content exceeds 2.0 percent by weight.

The inventive wire electrode for electro-discharge machining preferably has tensile strength of at least 90 kg/mm², while the ratio of 0.2% yield strength to tensile strength is preferably 0.85 to 0.95. A large number of wire electrodes according to the present invention have tensile strength values of at least 90 kg/mm² and the ratios of 0.2% yield strength to tensile strength thereof are 0.85 to 0.95, to be within the aforementioned preferred ranges. Those satisfying such conditions are particularly excellent in easiness of automatical jointing.

A manufacturing method according to the present invention comprises the steps of preparing a Cu alloy material containing 38 to 50 percent by weight of Zn and thinning the Cu alloy material employing roll working and/or warm working at least in a part of working process.

The roll working includes rolling and roller-die drawing.

According to the present invention, roll working and/or warm working is performed at least in a part of working process, so that the Cu alloy material can be thinned to a wire diameter applicable to a wire electrode for electro-discharge drawing, even if the material is relatively inferior in workability.

In the Cu alloy material subjected to roll working and/or warm working according to the present invention, β phase is homogeneously distributed as compared with that subjected to no such working. Thus, it is considered that the β phase generated in the alloy is disporsed by roll working and/or warm working performed according to the present invention, to improve workability.

The wire electrode for electro-discharge machining according to the present invention has excellent electro-discharge machining characteristics such as a high processing speed and no adhesion of the wire electrode to a workpiece. The inventive wire electrode shows excellent electro-discharge machining characteristics particularly in an electro-discharge machine which provides high and short-time pulse voltage.

DESCRIPTION OF THE PREFERRED EMBODIMENTS

EXAMPLES NOS. 1 TO 6, REFERENCE EXAMPLE NO. 19 AND PRIOR ART EXAMPLE NO. 31

Zn was added to melts of ordinary electric copper in contents shown in Table 1, and the melts were continuously cast to obtain Cu alloy materials shown in Table 1. These Cu alloy materials were worked into rough wires of 8 mm in diameter by hot extrusion. The rough wires were thinned by the following methods (1) to (5), to manufacture wire electrodes of 0.2 mm in diameter.

(1) A method of working the wire of 8 mm in diameter into a diameter of 1.6 mm by cold rolling and then working the same into a diameter of 0.2 mm by cold die drawing.

(2) A method of working the wire of 8 mm in diameter into a diameter of 1.6 mm by cold roller-die drawing and then working the same into a diameter of 0.2 mm by cold die drawing.

(3) A method of working the wire of 8 mm in diameter into a diameter of 1.6 mm by warm die drawing at a temperature of 190° C., and then working the same into a diameter of 0.2 mm by cold die drawing.

(4) A method of working the wire of 8 mm in diameter into a diameter of 1.6 mm by warm rolling at a temperature of 150° C., and then working the same into a diameter of 0.2 mm by cold die drawing.

(5) A method of working the wire into a diameter of 0.2 mm by repeating cold drawing and heat treatment. Table 1 shows frequencies of heat treatment required at this time. A high frequency of heat treatment means a small rate of reduction by single heat treatment and inferior workability of wire drawing.

In every method, heating treatment was softly made in the final stage of thinning, in order to straighten the wire.

The as-formed wire electrodes were mounted on wire electro-discharge machines to perform electro-discharge machining under the same conditions, thereby evaluating processing speeds, amounts of adhesion to workpieces, surface smoothness states of the workpieces and states of breaking of the wire electrodes. Table 1 shows the results too.

The processing speeds were evaluated by working sectional areas (products of the processing speeds and the values of thickness of the workpieces) per unit time, and expressed in relative ratios, supposing that the processing speed of the wire electrode for electro-discharge machining according to the prior art example No. 31 was 1.00.

The amounts of adhesion to the workpieces were also expressed in relative ratios, supposing that the amount of adhesion of the prior art example No. 31 was 100.

The surface roughness states of the workpieces were evaluated along the following A and B:

A: The surface is in a smooth and good state with no variation of tolerance in the direction of thickness.

B: The surface is in a rough state.

Reference example No. 19 was so frequently broken during the working process that it was impossible to work the same into the diameter of 0.2 mm.

TABLE 1

|  | No. | Cu | Zn (wt. %) | Working Method | Frequency of Heat Treatment | Processing Speed Ratio | workpiece Amount of Adhesion | workpiece surface Smoothness | Frequency of wire Breaking |
| --- | --- | --- | --- | --- | --- | --- | --- | --- | --- |
| Example | 1 | Rest | 39.2 | (1) | — | 1.29 | 71 | A | 0 |
|  | 2 | Rest | 48.2 | (3) | — | 1.31 | 72 | A | 0 |
|  | 3 | Rest | 42.7 | (2) | — | 1.39 | 61 | A | 0 |
|  | 4-1 | Rest | 41.0 | (2) | — | 1.38 | 59 | A | 0 |
|  | 4-2 | Rest | 41.0 | (5) | 9 | 1.29 | 65 | A | 0 |
|  | 5 | Rest | 44.2 | (4) | — | 1.41 | 60 | A | 0 |
|  | 6 | Rest | 45.1 | (4) | — | 1.40 | 62 | A | 0 |
| Reference Example | 19 | Rest | 55.0 | (1) | — | — | — | — | — |
| Prior Art | 31 | Rest | 34.8 | (5) | 2 | 1.00 | 100 | B | 4 |

As clearly understood from the results shown in Table 1, the wire electrodes according to Examples Nos. 1 to 6, containing 38 to 50 percent by weight of Zn according to the present invention, have higher processing speeds, smaller amounts of adhesion to the workpieces and superior surface smoothness states of the workpieces as compared with the prior art example workpieces, surface smoothness states of the workpieces and states of breaking of the wire electrodes. Table 2 also shows the results.

TABLE 2

|  | No. | Cu | Zn (wt. %) | Additional Element |  | Working Method | Frequency of Heat Treatment | Processing Speed Ratio | Workpiece Amount of Adhesion | Workpiece Surface Smoothness | Frequency of Wire Breaking |
| --- | --- | --- | --- | --- | --- | --- | --- | --- | --- | --- | --- |
| Example | 7 | Rest | 40.6 | Zr:0.2 |  | (5) | 2 | 1.35 | 65 | A | 0 |
|  | 8-1 | Rest | 41.3 | Zr:0.1 |  | (5) | 3 | 1.29 | 70 | A | 0 |
|  | 8-2 | Rest | 41.3 | Zr:0.1 |  | (1) | — | 1.33 | 66 | A | 0 |
|  | 9 | Rest | 40.7 | Zr:0.3 |  | (5) | 2 | 1.31 | 60 | A | 1 |
|  | 10-1 | Rest | 41.7 | Ti:0.025 |  | (5) | 3 | 1.26 | 71 | A | 0 |
|  | 10-2 | Rest | 41.7 | Ti:0.025 |  | (4) | — | 1.32 | 67 | A | 0 |
|  | 11 | Rest | 45.8 | Bi:0.007 |  | (5) | 3 | 1.33 | 67 | A | 1 |
|  | 12 | Rest | 43.6 | Ti:0.004 Mn:0.003 | Mg:0.012 | (5) | 3 | 1.31 | 64 | A | 0 |
|  | 13-1 | Rest | 42.3 | Ce:0.006 | Mn:0.002 | (5) | 3 | 1.28 | 72 | A | 0 |
|  | 13-2 | Rest | 42.3 | Ce:0.006 | Mn:0.002 | (4) | — | 1.31 | 68 | A | 0 |
|  | 14 | Rest | 41.9 | Al:0.2 |  | (1) | — | 1.27 | 66 | A | 0 |
|  | 15-1 | Rest | 42.8 | Al:0.9 | Si:0.05 | (2) | — | 1.32 | 68 | A | 0 |
|  | 15-2 | Rest | 42.8 | Al:0.9 | Si:0.05 | (5) | 10 | 1.28 | 70 | A | 0 |
|  | 16 | Rest | 44.9 | Fe:0.1 |  | (4) | — | 1.31 | 72 | A | 0 |
|  | 17 | Rest | 45.1 | Ca:0.2 | La:0.05 | (3) | — | 1.30 | 69 | A | 0 |
|  | 18 | Rest | 43.3 | Si:0.2 |  | (1) | — | 1.29 | 61 | A | 0 |
| Reference | 19 | Rest | 55.0 | — |  | (1) | — | — | — | — | — |
| Example | 20 | Rest | 40.9 | Zr:0.005 |  | (2) | — | 1.25 | 75 | A | 0 |
|  | 21 | Rest | 41.1 | Zr:1.7 |  | (3) | — | 1.02 | 85 | B | 1 |
|  | 22 | Rest | 40.3 | Ce:0.02 Mn:0.03 | Ti:0.03 | (4) | — | 1.19 | 79 | B | 2 |
|  | 23 | Rest | 43.8 | Al:1.5 Fe:0.5 | Si:0.2 Ca:0.3 | (2) | — | 1.20 | 74 | A | 1 |
|  | 24 | Rest | 42.5 | Ce:0.0004 Mg:0.0002 |  | (3) | — | 1.11 | 81 | A | 0 |
|  | 25 | Rest | 44.2 | Al:0.003 |  | (4) | — | 1.19 | 76 | A | 1 |
|  | 26 | Rest | 35.4 | Zr:0.12 |  | (3) | — | 1.04 | 94 | B | 2 |
|  | 27 | Rest | 34.7 | Ce:0.01 |  | (4) | — | 1.03 | 92 | B | 4 |
|  | 28 | Rest | 33.9 | Ti:0.007 Mg:0.009 |  | (1) | — | 1.08 | 96 | B | 3 |
|  | 29 | Rest | 35.8 | Al:1.1 | Fe:0.1 | (2) | — | 1.02 | 89 | B | 3 |
|  | 30 | Rest | 36.1 | Si:0.2 | Ca:0.3 | (3) | — | 1.01 | 95 | B | 7 |
| Prior Art | 31 | Rest | 34.8 |  |  | (5) | 2 | 1.00 | 100 | B | 4 |

No. 31. Further, the wire electrodes were hardly broken during the machining processes.

The wire electrode according to Example No. 4-2, which was thinned from 8 mm to 0.2 mm in diameter using only cold die drawing, required intermediate annealing, i.e., heat treatment, nine times during the working process. This heat treatment was performed at 530° C. for three hours each time. Comparing Example No. 4-2 with other Examples, it is understood that workability is greatly improved by employing roll working and/or warm working as a part of the working process. Further, the processing speed and the amount of adhesion to the workpiece are also improved.

EXAMPLES NOS. 7 TO 18 AND REFERENCE EXAMPLES NOS. 20 TO 30

The following description is made as to Experimental Examples in which other elements were further added to Cu.

Zn and other elements were added to melts of ordinary electric copper in amounts shown in Table 2, and the melts were continuously cast to obtain Cu alloy materials. These Cu alloy materials were worked into rough wires of 8 mm in diameter by hot extrusion, similarly to the above Examples. These rough wires were thinned by the aforementioned methods (1) to (5), to manufacture wire electrodes of 0.2 mm in diameter.

The wire electrodes were mounted on wire electro-discharge machines to perform electro-discharge machining under the same conditions as above, thereby evaluating processing speeds, amounts of adhesion to The wire electrodes according to Examples Nos. 7 to 18 exhibited higher processing speeds, smaller amounts of adhesion to the workpieces and superior states of surface smoothness as compared with those according to reference examples Nos. 26 to 30, whose Zn contents were less than 38 percent by weight. Further, these wire electrodes were hardly broken during the machining processes.

Comparing Examples Nos. 7 to 9 with reference examples Nos. 20 and 21, it is understood that the content of Zr is preferably 0.01 to 1.0 percent by weight.

Comparing Examples Nos. 10-1 to 13-2 with reference examples Nos. 22 and 24, it is understood that the content of at least one element selected from the group of Ce, Ti, Mg, Bi and Mn is preferably 0.001 to 0.05 percent by weight in total.

Comparing Examples Nos. 14 to 18 with reference examples Nos. 23 and 25, it is understood that the content of at least one element selected from the group of Al, Si, Fe, Ca and La is preferably 0.01 to 2.0 percent by weight in total.

Comparing Example No. 10-1 with Example No. 10-2, Example No. 13-1 with Example No. 13-2 and Example No. 15-1 with Example No. 15-2, it is understood that workability as well as electro-discharge machining characteristics, such as the processing speed and the amount of adhesion to the workpiece, can be improved by employing roll working and/or warm working as part of the working process.

Table 3 shows values of tensile strength and 0.2% yield strength, the ratios of 0.2% yield strength to tensile strength and values of easiness of automatical jointing of the aforementioned Examples Nos. 1 to 18, reference examples Nos. 19 to 30 and prior art example No. 31. As understood from Table 3, reference examples Nos. 25 to 27 and 29, showing the ratios of 0.2% yield strength to tensile strength in excess of 0.95, were inferior in easiness of automatical jointing.

Other Examples, whose ratios of 0.2 yield strength to tensile strength were within the range of 0.85 to 0.95, were excellent in easiness of automatical jointing.

The wire electrodes according to Examples Nos. 1 to 18 exhibited tensile strength values of at least 90 kg/mm² and ratios of 0.2% yield strength to tensile strength within the range of 0.85 to 0.95, and were excellent in easiness of automatical jointing. Thus, the inventive wire electrodes can be generally regarded as being excellent in easiness of automatical jointing.

Although the present invention has been described and illustrated in detail, it is clearly understood that the same is by way of illustration and example only and is not to be taken by way of limitation, the spirit and scope of the present invention being limited only by the terms of the appended claims.

TABLE 3

| No. | Tensile Strength (kg/mm²) | 0.2% Yield Strength (kg/mm²) | 0.2% Yield Strength/Tensile Strength × 100 (%) | Easiness of Automatical Jointing |
|-----|---------------------------|------------------------------|------------------------------------------------|----------------------------------|
| 1   | 99.3  | 90.1  | 90.7 | Good |
| 2   | 98.2  | 89.3  | 90.9 | Good |
| 3   | 102.4 | 96.4  | 94.1 | Good |
| 4-1 | 103.7 | 91.7  | 88.4 | Good |
| 4-2 | 99.6  | 93.7  | 94.1 | Good |
| 5   | 96.8  | 87.9  | 90.8 | Good |
| 6   | 107.1 | 92.4  | 86.3 | Good |
| 7   | 101.5 | 90.8  | 89.5 | Good |
| 8-1 | 97.6  | 92.7  | 95.0 | Good |
| 8-2 | 98.8  | 92.9  | 94.0 | Good |
| 9   | 105.9 | 91.1  | 86.0 | Good |
| 10-1| 104.4 | 89.2  | 85.4 | Good |
| 10-2| 105.2 | 97.5  | 92.7 | Good |
| 11  | 96.2  | 86.8  | 90.2 | Good |
| 12  | 99.7  | 90.2  | 90.5 | Good |
| 13-1| 109.1 | 93.5  | 85.7 | Good |
| 13-2| 109.4 | 97.1  | 88.8 | Good |
| 14  | 105.3 | 94.3  | 89.6 | Good |
| 15-1| 111.5 | 95.4  | 85.6 | Good |
| 15-2| 106.3 | 95.8  | 90.1 | Good |
| 16  | 102.8 | 92.7  | 90.2 | Good |
| 17  | 98.6  | 88.5  | 89.8 | Good |
| 18  | 108.7 | 93.6  | 86.1 | Good |
| 19  | —     | —     | —    | —    |
| 20  | 103.4 | 91.8  | 88.8 | Good |
| 21  | 99.1  | 88.7  | 89.5 | Good |
| 22  | 101.5 | 89.2  | 87.9 | Good |
| 23  | 112.2 | 97.3  | 86.7 | Good |
| 24  | 98.9  | 89.1  | 90.1 | Good |
| 25  | 102.8 | 101.2 | 98.4 | Poor |
| 26  | 97.5  | 96.1  | 98.6 | Poor |
| 27  | 99.3  | 98.9  | 99.6 | Poor |
| 28  | 103.6 | 91.4  | 88.2 | Good |
| 29  | 104.1 | 101.8 | 97.8 | Poor |
| 30  | 63.4  | 50.1  | 79.0 | Good |
| 31  | 109.6 | 94.7  | 86.4 | Good |

What is claimed is:

1. A wire electrode for electro-discharge machining, said wire electrode being made of a Cu alloy containing from more than 40 and up to 50 percent by weight of Zn and 0.01 to 2.0 percent by weight in total of Al.

2. A wire electrode for electro-discharge machining in accordance with claim 1, wherein said wire electrode has a tensile strength of at least 90 kg/mm², while the ratio of 0.2% yield strength to tensile strength thereof is 0.85 to 0.95.

3. A wire electrode for electro-discharge machining in accordance with claim 1, wherein said Cu alloy is produced by a working process in which said Cu alloy is thinned by roller-die drawing in at least a part of said working process.

4. A wire electrode for electro-discharge machining in accordance with claim 1, wherein said Cu alloy material contains from 40.1 to 50 percent by weight of Zn.

5. A wire electrode for electro-discharge machining, being manufactured by:
   preparing a Cu alloy material containing from more than 40 and up to 50 percent by weight of Zn and 0.01 to 2.0 percent by weight in total of Al; and
   subjecting said Cu alloy material to a working process wherein said Cu alloy material is thinned by warm working in at least a part of said working process.

6. A wire electrode for electro-discharge machining in accordance with claim 5, wherein said Cu alloy material contains from 40.1 to 50 percent by weight of Zn.

7. A method of manufacturing a wire electrode for electro-discharge machining, comprising the steps of:
   preparing a Cu alloy material containing from more than 40 and up to 50 percent by weight of Zn and 0.01 to 2.0 percent by weight in total of Al; and
   subjecting said Cu alloy material to a working process wherein said Cu alloy material is thinned by warm roll working in at least a part of said working process.

8. A method of manufacturing a wire electrode for electro-discharge machining in accordance with claim 7, wherein said Cu alloy material contains from 40.1 to 50 percent by weigh of Zn.

* * * * *